United States Patent [19]

Tyler

[11] Patent Number: 5,184,521
[45] Date of Patent: Feb. 9, 1993

[54] GYROSCOPICALLY STABILIZED APPARATUS

[76] Inventor: Nelson Tyler, 15801 Royal Oak Rd., Encino, Calif. 91436

[21] Appl. No.: 794,000

[22] Filed: Nov. 18, 1991

[51] Int. Cl.⁵ .................. G01C 19/26; G01C 19/30; G03B 17/00
[52] U.S. Cl. .................... 74/5.34; 74/5.1; 74/5.22; 74/5.42; 74/5.44; 248/324; 248/612; 352/243; 354/70
[58] Field of Search .......... 74/5.34, 5.22, 5.44, 74/5.42, 5.1; 352/243; 354/70, 81; 248/612, 323, 324

[56] References Cited

U.S. PATENT DOCUMENTS

| | | | |
|---|---|---|---|
| 2,883,863 | 4/1959 | Karsten et al. | 74/5.34 X |
| 2,937,531 | 5/1960 | Gallagher | 74/5.1 |
| 2,960,874 | 11/1960 | Glenny et al. | 74/5.1 |
| 3,352,521 | 11/1967 | Tyler | 248/179 X |
| 3,380,310 | 6/1964 | Di Tommaso | 74/5.22 |
| 3,467,350 | 9/1969 | Tyler | 248/179 |
| 3,638,502 | 2/1972 | Leavitt et al. | 74/5.34 |
| 3,731,544 | 5/1973 | Acker et al. | 74/5.22 |
| 3,917,199 | 11/1975 | Dewitt | 244/118 R |
| 4,020,491 | 4/1977 | Bieser et al. | 74/5.42 X |
| 4,645,320 | 2/1987 | Muelling et al. | 354/81 |
| 4,685,649 | 8/1987 | McKay | 248/594 |
| 4,752,791 | 6/1988 | Allred | 354/81 |
| 4,825,232 | 4/1989 | Howdle | 354/81 X |
| 4,826,310 | 5/1989 | Goodman | 352/78 R |
| 4,989,466 | 2/1991 | Goodman | 74/5.22 |

FOREIGN PATENT DOCUMENTS 651505 10/1937 Fed. Rep. of Germany ...... 248/612

Primary Examiner—Rodney H. Bonck
Attorney, Agent, or Firm—Joseph F. McLellan

[57] ABSTRACT

A gyroscopically stabilized apparatus for aiming an instrument at a target object. An external yoke is attached to the ends of a hub assembly which supports the gyro and camera platforms for rotation about pan, tilt and roll axes. The yoke is associated with an externally located vibration damping system interposed between the yoke and the support arm attached to the helicopter or other transporting vehicle. This makes possible a greater degree of helicopter pitch and roll without having any support structure impact the gyro and camera. In one embodiment the platforms are associated with separately rotatable hemispheres joined to provide a spherical fairing. In another embodiment the hemispheres are attached together for common rotation about pan and tilt axes.

31 Claims, 7 Drawing Sheets

GYROSCOPICALLY STABILIZED APPARATUS

BACKGROUND OF THE INVENTION

1. Field of the Invention

The present invention relates to gyroscopically stabilized apparatus, and particularly to gyroscopically stabilized apparatus for aiming an instrument at a target object.

2. Description of the Prior Art

Although the invention has broad application to the stabilization of practically any instrument carried by a vehicle, it has particular utility in stabilizing a helicopter mounted camera system for filming motion pictures. Therefore, the emphasis in the ensuing discussion on helicopter camera systems should be understood to be merely exemplary.

In my U.S. Pat. Nos. 3,352,521 (Universal Mount) and 3,467,350 (Vibration Damping Mount), systems were disclosed for steadying a helicopter mounted camera during manual tracking of a target object, and for substantially isolating the camera from helicopter induced vibrations. A need has since developed for an effective remote controlled stabilized platform for supporting the camera.

Such a platform is disclosed in U.S. Pat. No. 3,638,502, issued to Leavitt et al, and a related system is disclosed in U.S. Pat. No. 4,989,466, issued to Goodman.

Both of these prior art systems disclose a stabilized gyro platform and a camera platform which are both housed within a fairing shaped like a dome or sphere. The camera platform is supported by the gyro platform for movement within the sphere about a tilt axis. The gyro platform is coupled to a universal joint which is suspended from a vertical support post. This enables the helicopter to pitch and roll relative to the level and stable gyro and camera platforms. However, the degree of pitch and roll is limited because the vertical support post impacts against either the gyro or the camera itself.

The support post extends from the internal universal joint to a point located exteriorly of the sphere, where it is connected to a support arm projecting from the side of the helicopter.

The sphere is rotated by a servomechanism in response to a position sensor to maintain alignment between a window in the sphere and the camera lens during panning and tilting of the camera platform. Coordination of the operation of the camera platform and the servomechanism controlling the window location must be precise, introducing a degree of undesired complexity into the apparatus.

Additional complexity is presented by the internal location of the support post. The helicopter can only pitch and roll to a predetermined extent. Beyond that the camera or gyro platforms strike the post and the gyros will uncontrollably precess or tumble. Further operations then have to wait until the gyros are erected or caged to stabilize the gyro platform.

SUMMARY OF THE INVENTION

According to the present invention, a gyroscopically stabilized apparatus is provided for aiming a camera or other instrument at a target object. The apparatus comprises a camera platform for supporting the camera on a vehicle such as a helicopter. The camera platform in turn is supported by a hub assembly which receives one or more hub shafts for rotation of the hub assembly and camera platform about a roll axis. The camera platform is also rotatable on the hub assembly along a tilt axis perpendicular to the roll axis for tilting of the camera and to enable relative pitching of the aircraft.

The apparatus further comprises a gyro platform which is stabilized in space by three orthogonally arranged gyroscopes. The gyro platform is supported by the camera platform for rotation about a pitch axis coincident with the tilt axis of the camera platform.

A yoke is connected to the outer ends of the hub shaft or shafts, as the case may be, and it is suspended from a vibration damping unit carried by a support arm that projects from one side of the helicopter. A vertical shaft at the top of the yoke allows rotational movement to compensate for helicopter yaw motions, and also to enable panning of the camera.

An important feature of the invention is that the yoke and its connections to the hub shaft ends are located externally, that is, out of the paths of rotation of both the camera and gyro platforms. This means that the helicopter can pitch or roll to a much greater degree, compared to prior art systems, without having any support structure strike the camera platform.

The platforms are preferably surrounded by a spherical fairing which is split into camera and gyro halves or hemispheres associated with the camera and gyro platforms, respectively.

The externally located yoke is configured into either a half circle or a quarter circle, depending upon whether one or two hub shafts are employed. Further, it may be configured in offset relation to the hub shafts to prevent it from obscuring the camera lens during extreme roll maneuvers.

Inasmuch as the camera hemisphere moves with the camera platform, the camera window is always aligned with the camera lens. There is therefore no need to provide complex servomechanisms or window position sensors to insure such alignment.

In a preferred embodiment the gyro hemisphere is stabilized with the gyro platform, while the camera hemisphere and camera tilts relative to the gyro hemisphere. In a second embodiment, the two hemispheres are coupled together so that they pan and tilt in unison.

The present apparatus thus provides greatly increased freedom of helicopter movement about the stabilized gyro platform and camera, and greatly reduces any danger of impingement of the camera platform with internally located support posts and the like.

Other aspects and advantages of the present invention will become apparent from the following more detailed description taken in conjunction with the accompanying drawings.

DESCRIPTION OF THE PREFERRED EMBODIMENTS

Figure 1:
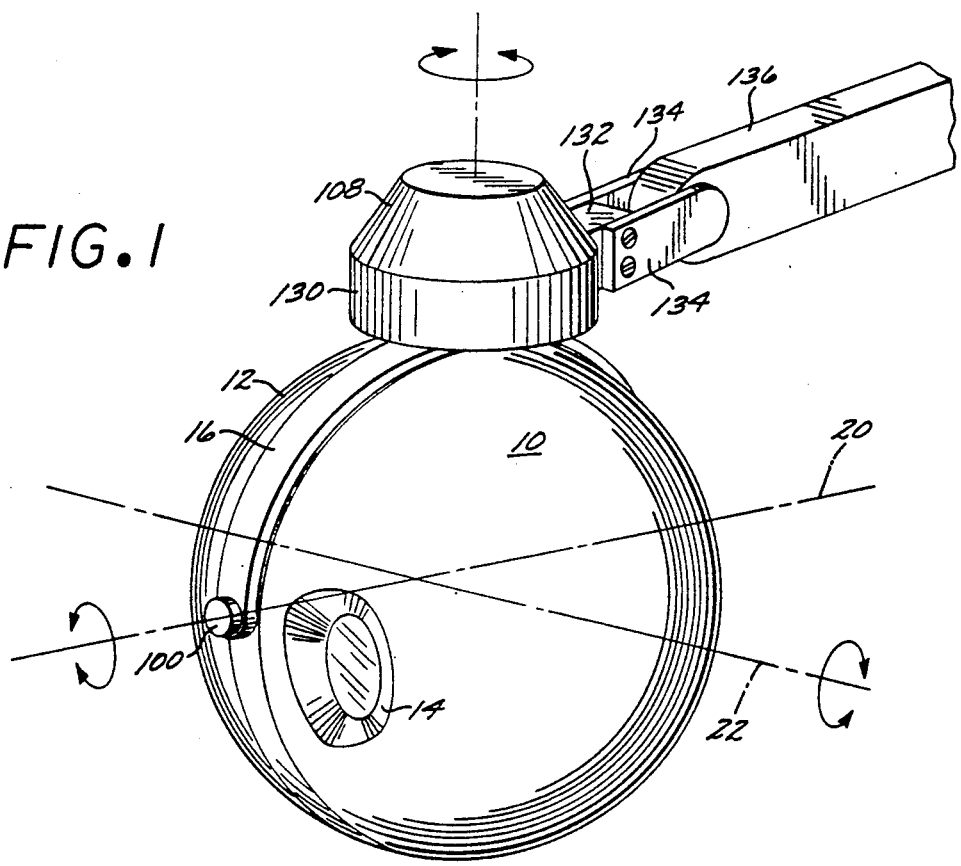
FIG. 1 is a perspective view of a gyroscopically stabilized apparatus according to the present invention, and utilizing a half circle yoke suspended from a supporting arm projecting from the side of a helicopter.

As previously indicated, the present apparatus will be described in connection with a camera mounted to a helicopter for aiming at a target object. However, the apparatus is equally useful in the mounting of various kinds of instruments, sensors and the like to many different kinds of vehicles, including fixed wing aircraft, blimps, boats, automobiles, camera dollys, etc.

Further, many of the individual components used in the present apparatus and their methods of operation are well known to those skilled in the art of gyroscopically stabilized camera platforms. Accordingly, for brevity a detailed description of such components and methods is omitted.

The present apparatus preferably comprises an aerodynamic drag reducing spherical fairing enclosing most of the components of the apparatus. The fairing is defined by a pair of hemispheres constituting a camera hemisphere 10 and a gyro hemisphere 12. The camera hemisphere 10 includes an opening or window 14 through which the lens of the camera may be aimed. As will be seen, the camera hemisphere 10 and the associated camera rotate in unison so there is no need for a sensor/servomechanism arrangement to insure alignment of the lens and the portion of the hemisphere having the window.

The gyro and camera hemispheres 10 and 12 are supported by a semi-circular yoke 16 which, as will be seen, is attached to a horizontally oriented hub assembly 18 located within the two hemispheres. The hemispheres 10 and 12 are rotatable about a roll axis 20 defined by the hub assembly 18, and they are also rotatable relative to one another about a pitch or tilt axis 22 which is perpendicular to the roll axis 20. The term pitch is used to denote the helicopter pitching motion, which is about a pitch axis aligned with the tilt axis of the camera.

Because most of the support structure of the present apparatus is located externally of the sphere, there is little chance that the camera will strike support structure during pitch and roll movement of the helicopter. This is in contrast to prior art apparatus employing a universal Cardan joint to suspend the camera and gyros. In such prior art, the universal joint is coupled to the base of an internal vertical support post whose location permits only limited helicopter pitch and roll movement relative to the level and stable gyro platform.

Figure 2:
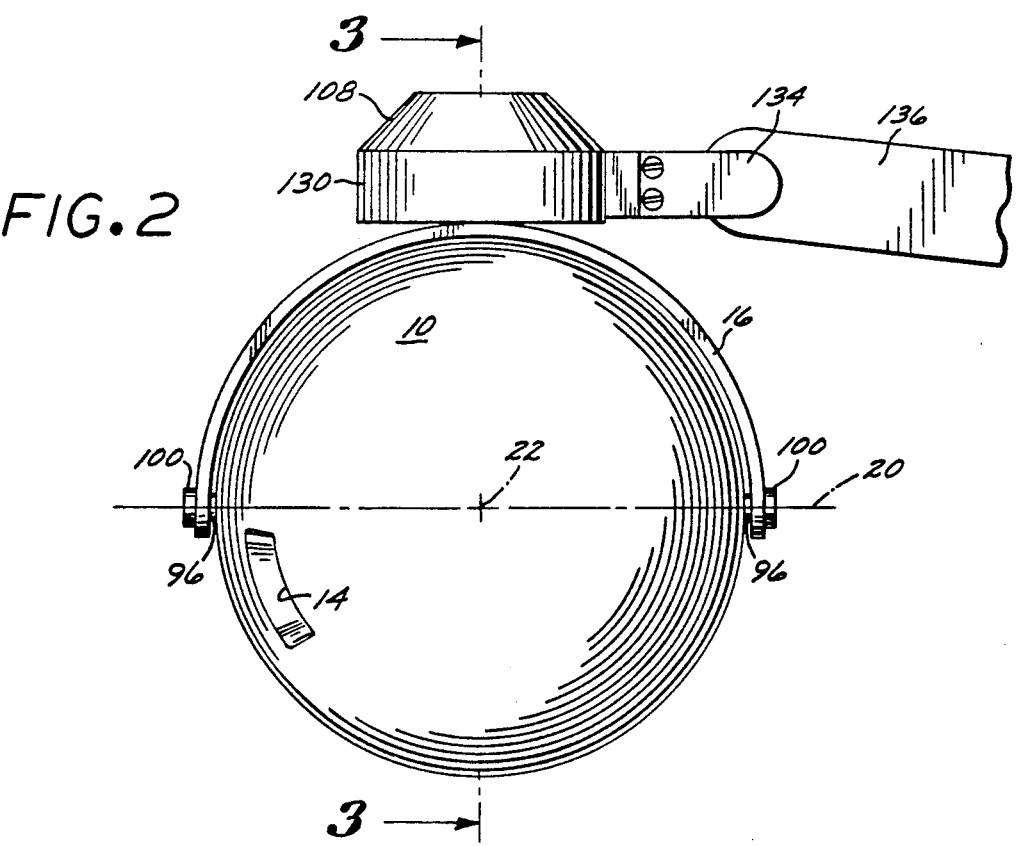
FIG. 2 is a left side elevational view of the apparatus of FIG. 1.
Figure 3:
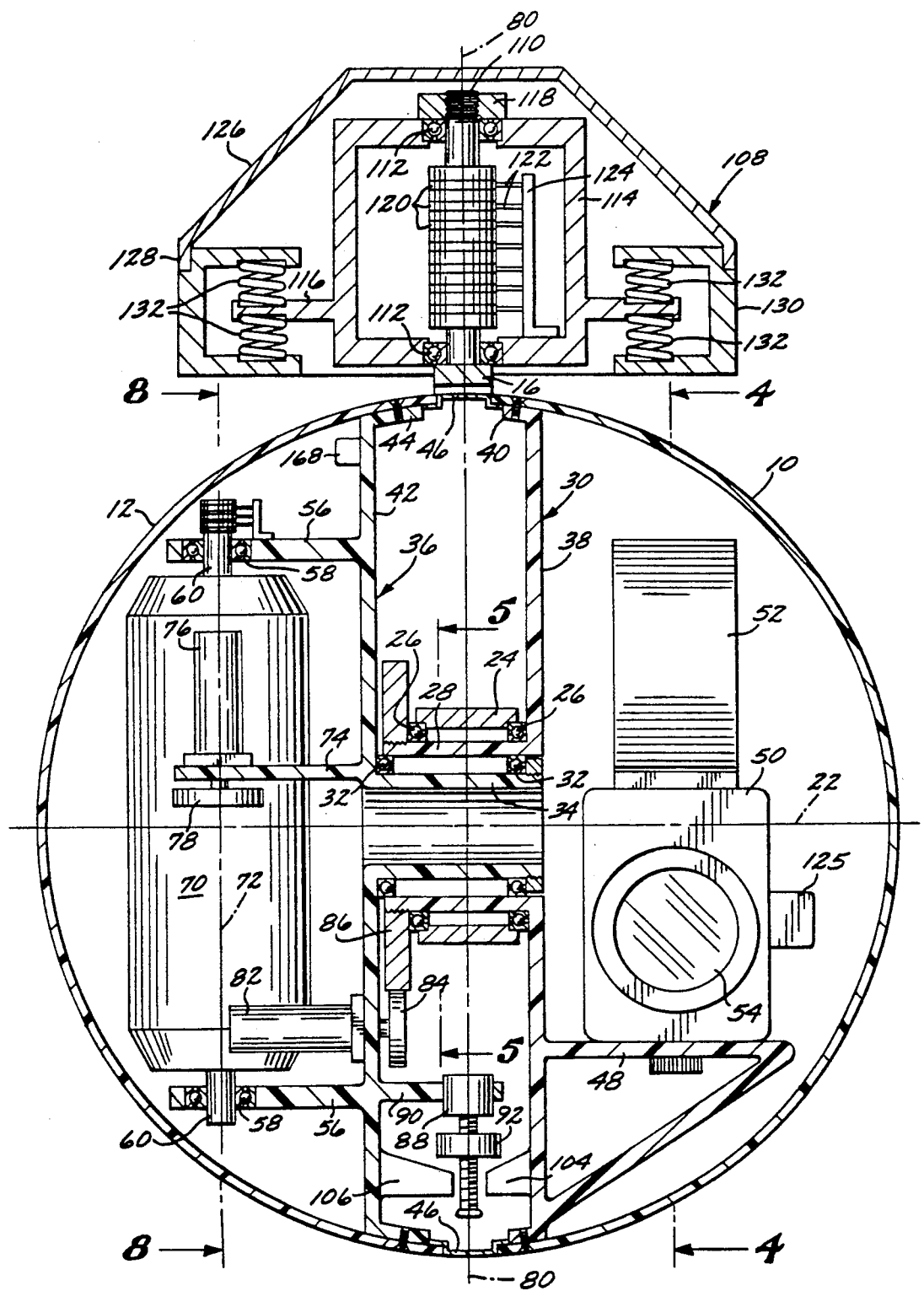
FIG. 3 is an enlarged view taken along the line 3—3 of FIG. 2.
Figure 4:
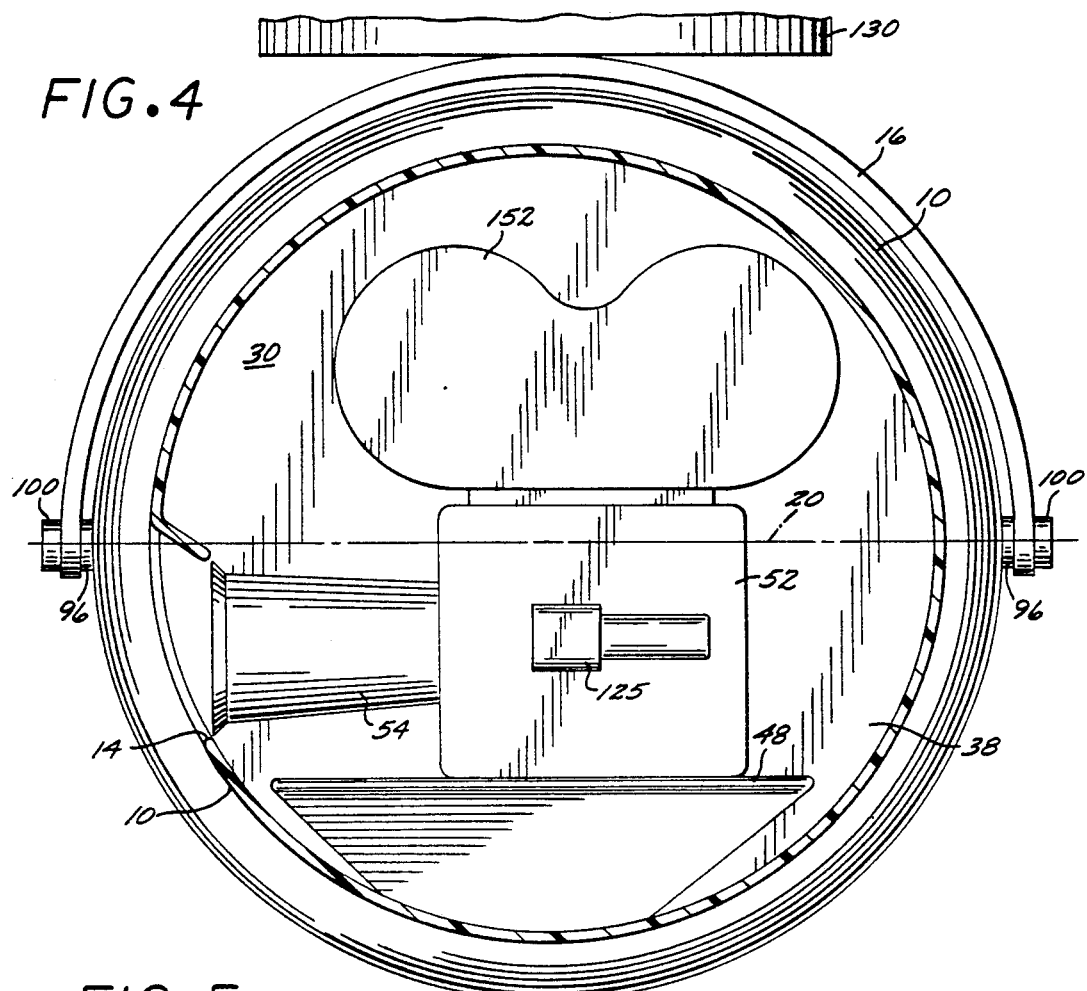
FIG. 4 is a view taken along the line 4—4 of FIG. 3.
Figure 5:
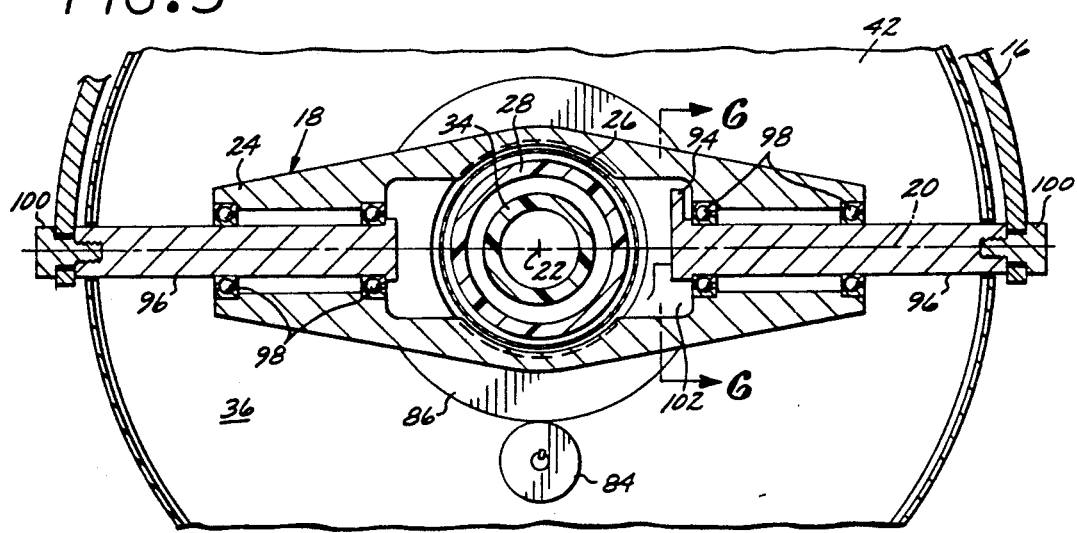
FIG. 5 is an enlarged view taken along the line 5—5 of FIG. 3.
Figure 6:
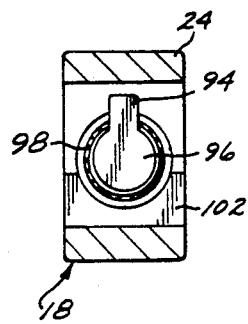
FIG. 6 is a view taken along the line 6—6 of FIG. 5.

Referring now to the drawings, and particularly to FIGS. 1-6, the hub assembly 18 comprises an elongated, horizontally oriented hub block 24 defining or extending along the roll axis 20, and having a central, transversely oriented cut out portion or opening. A pair of transversely spaced bearings 26 are mounted within this opening with their outer races engaged upon the hub block 24, and with their inner races engaged upon and supporting the cylindrical hub 28 of a camera platform 30. The bearings 26 define the tilt axis 22, as best seen in FIGS. 3 and 5.

Another pair of transversely spaced bearings 32 are mounted with their outer races engaged upon the camera platform hub 28, and with their inner races engaged upon and supporting the cylindrical hub 34 of a gyro platform 36.

The axes of the hubs 28 and 34 define the tilt axis 22 of the camera platform 38, and also the pitch axis of the gyro platform 36 which, as will be seen, is stabilized in space so that its pitch axis represents the pitch axis of the helicopter (not shown).

The hub 28 of the camera platform 30 is integral with a generally circular vertical wall or plate 38 having a circumferential outer flange 40. The flange 40 is attached by screws or the like to the interior of the margin of the camera hemisphere 10 so that the camera hemisphere 10 and the camera platform 30 rotate together.

Likewise, the hub 34 of the gyro platform 36 is integral with a generally circular vertical wall or plate 42 having a circumferential outer flange 44. The flange 44 is attached by screws or the like to the interior of the margins of the gyro hemisphere 12 so that the gyro hemisphere 12 and the gyro platform 36 rotate together.

The two hemispheres halves 10 and 12 are spaced apart slightly, and a circular slip ring 46 is fitted between them. The slip ring 46 includes a central portion forming a smooth continuation of the outer surfaces of the adjacent hemispheres 10 and 12, and a pair of oppositely directed flanges inwardly offset from the central portion underlie the inner surfaces of the hemispheres 10 and 12 in sliding relation. The flanges retain the slip ring 46 in position between the hemispheres 10 and 12 during relative sliding movement of the two hemispheres.

The camera platform 30 includes a camera shelf 48 formed by a horizontal plate integral with and extending outwardly of the plate 38. The shelf 48 is also formed by a diagonal plate extending inwardly and downwardly to the plate 38 from the outer edge of the horizontal plate.

A conventional motion picture camera 50 is suitably mounted to the camera shelf 48, and includes the usual film magazine portion 52 and a lens portion 54. The lens of the portion 54 is aimed toward and aligned with the opening or window 14.

Figure 8:
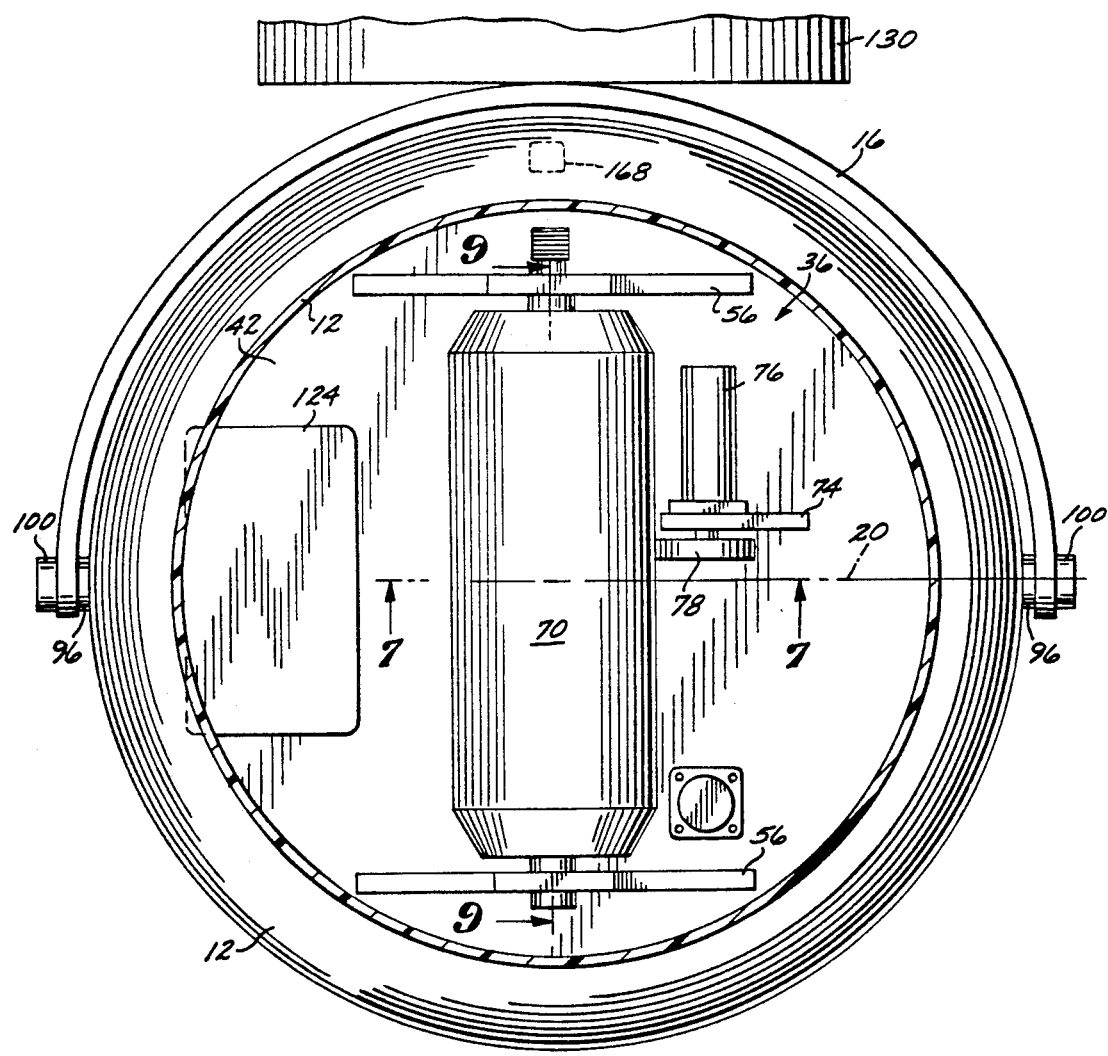
FIG. 8 is a view taken along the line 8—8 of FIG. 3.
Figure 9:
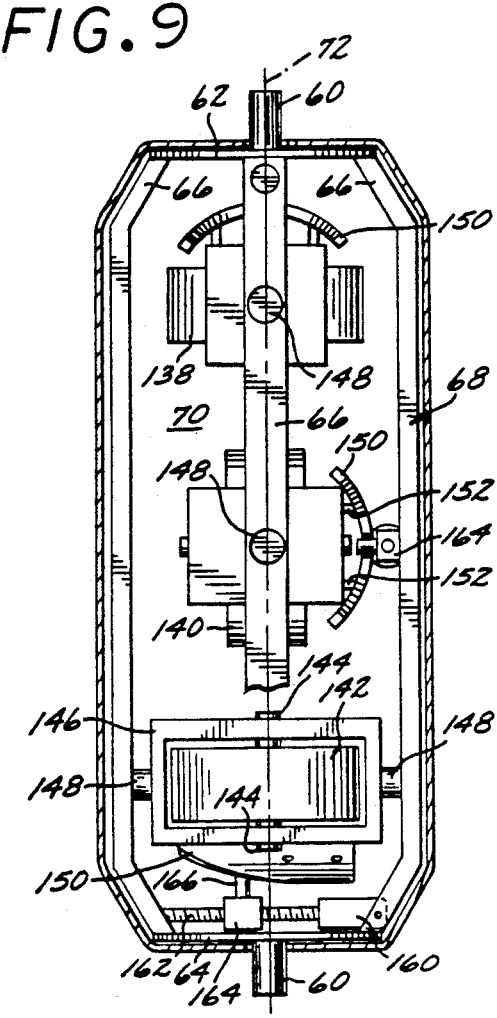
FIG. 9 is a view taken along the line 9—9 of FIG. 8.

The gyro platform 36 includes a pair of horizontal, vertically spaced gyro support plates or arms 56 which are integral with and extend outwardly from the plate 42. The arms 56 mount a pair of vertically aligned bearings 58 which rotatably support upper and lower stub shafts 60 attached, respectively, to upper and lower plates 62 and 64 that are secured to the opposite ends of four vertical posts 66. The circular plates 62 and 64 and the posts 66 define a gyro frame 68 enclosed within a cylindrical gyro housing 70, as best seen in FIGS. 8 and 9. The arrangement enables the gyro housing 70 to rotate about a vertical gyro housing axis 72 defined by the stub shafts 60.

A support arm 74 integral with the vertical plate 36 of the gyro platform 36 supports a vertically oriented pan motor 76. The motor drive shaft carries a drive wheel 78 engaged upon the exterior surface of the gyro housing 70, as best seen in FIG. 3. Consequently, when the pan motor 76 is energized a torque is developed which tends to rotate the gyro housing 70 but, when the gyro housing 70 is stabilized in space by operation of the gyros within the housing 70, the torque instead rotates the gyro platform 36 and the camera and gyro hemispheres 10 and 12 about a vertical pan axis 80.

A horizontally oriented tilt motor 82 is attached to the circular vertical plate 42 of the gyro platform 36 and is operative to rotate the camera platform 30 about the tilt axis 22. This is accomplished by a drive wheel 84 carried by the output shaft of the motor 82 and engaged upon a circular, vertically oriented tilt plate or wheel 86. The wheel 86 is threaded or otherwise suitably fixed to the hub 28 of the camera platform 30. When the motor 82 is energized, a torque is developed which tends to rotate the wheel 86 but, once the gyro housing 70 is stabilized in space, the torque instead rotates or tilts the camera platform 30.

The gyro platform 36 also carries a level balance motor 88 which is mounted to an arm 90 integral with and extending inwardly of the plate 42 of the platform 36. The output shaft of the motor 88 is threaded and vertically oriented. It carries a weight 92 which is threadably raised or lowered, depending upon the direction of operation of the motor. The purpose of this arrangement will hereinafter be described in further detail.

Stop means are provided to limit the degree of rotation of the gyro and camera platforms 30 and 36 about the roll axis 20 and about the pitch or tilt axis 22. As best seen in FIG. 5, a transversely directed stop or tab 94 is integral or attached to the inner end of one of a pair of hub shafts 96 to limit roll travel.

The hub block 24 includes a pair of elongated shaft openings extending along the roll axis 20, and opening into the transverse central cut out portion of the hub block 24. A pair of hub shafts 96 extend into the shaft openings and are rotatably supported by pairs of axially spaced apart bearings 98.

A pair of headed bolts 100 extend through openings in the opposite ends of the yoke 16, and their threaded shanks extend into threaded openings in the outer ends of the hub shafts 96 to constrain the shafts 96 against rotation relative to the yoke 16. Since the yoke 16 is fixed against rotation about the roll axis 20, the shafts 96 are likewise constrained.

The hub block 24 includes an integral abutment 102 which extends inwardly toward the roll axis 20. With this arrangement, when the hub block 24 rotates about the roll axis 20, along with the camera platform 30 supported by the hub block 24, and along with the gyro platform 36 supported by the camera platform 30, the abutment 102 of the hub block 24 will engage the hub shaft tab 94 at a predetermined degree of rotation and stop further rotation.

Referring now to FIGS. 2 and 3, a generally similar stop means is illustrated for limiting the degree of rotation of the camera and gyro platforms 30 and 36 about the pitch or tilt axis 22. Although the location of the stop means is a matter of choice, depending upon the particular application, for illustrative purposes the stops have been illustrated as integral with the vertical plates 38 and 42 of the pair of hemispheres and, as will be seen, are engageable with one of the hub shafts 96.

More particularly, stop means in the form of a pair of tabs 104 and 106 are attached to and extend inwardly toward the pan axis 80 from the plates 38 and 42, respectively. As will be apparent, after a predetermined degree of tilt of the camera platform 38, the tab 104 will engage one or the other of the hub shafts 96, according to the direction of tilt, and thereby halt further tilting of the camera platform 30 about the tilt axis 22. In similar fashion, the degree of pitch of the gyro platform 36 is limited by engagement of the tab 106 with one or the other of the hub shafts 96, depending upon the direction of pitch.

As best seen in FIG. 3, the yoke 16 which supports the hub assembly 18 is in turn supported by a vibration isolating and damping assembly 108 which includes a vertically oriented shaft 110 supported for rotation about the pan axis 80 by a pair of vertically spaced bearings 112. The bearings are carried, respectively, in the upper and lower end walls of a cylindrical housing 114 having an outwardly directed circumferential flange 116. A nut 118 threaded onto the threaded upper end of the shaft 110 secures the shaft 110 against the upper bearing 112 so that the shaft 110 is rotatable relative to the housing 114.

Although not described in detail because the construction is well known, the shaft 110 within the housing 114 includes a plurality of slip rings 120 engageable, respectively, with a plurality of electrical contact brushes 122 mounted to a vertical support 124 attached to the lower end wall of the housing 114. Engagement between the rings 120 and the brushes 122 enables energization of the various motors, camera controls, etc. located within the sphere. Electrical cables (not shown) extend from a control console (not shown) located inside the passenger compartment of the helicopter to the slip rings 120 and brushes 122. From there other electrical cables or leads extend to the gyro housing 70, including electrical leads to energize the associated drive motors to spin the individual gyros on their spin axes, and further cables to a suitable electronic control unit such as that illustrated at 124 in FIG. 8.

Where there is sufficient space, the unit can be a single unit attached to the plate 42 of the gyro platform 36 12, as illustrated. Where mounting to the gyro platform 36 is not feasible, as will be seen in the case of the embodiment of FIG. 13, the electronic circuit boards, etc. can be placed in a number of smaller units and mounted where convenient in the camera hemisphere 10 (not shown). Typical electrical signals include those turning the camera on and off and those controlling camera motor speed, zoom lens position, iris opening position, pan and tilt. As well known to those skilled in the art, aiming or viewing of the camera 50 is accomplished by use of a video monitor (not shown) mounted on the passenger compartment control console, which derives its images from a video camera (not shown) or from a video tap mounted on the camera 50, as schematically illustrated at 125 in FIGS. 3 and 4. Electrical power is supplied by on board or carry on batteries in the helicopter.

The housing 114 carrying the slip rings 120 and brushes 122 is enclosed within a fairing cap or dome 126 having a depending flange or skirt 128 which is suitably attached to a circular support ring 130 of channel shape cross section. The confronting surfaces of the upper and lower walls defining the channel shape include a plurality of vertically aligned spring seats which each receive one end of a compression spring 132. The opposite ends of the springs 132 are seated in aligned spring seats formed in the opposite faces of the housing flange 116.

As seen in FIGS. 1 and 2, the support ring 130 includes an anchorage 132 fixed to a pair of links 134 which are attached to a support arm 136 for controlled pivotal movement of the ring 130 relative to the support arm 136. The internal mechanism of the linkage and its connection to the helicopter console is not illustrated because it does not form a part of the present invention, and a description thereof is omitted for brevity. Such movement affords a means for raising and lowering the sphere relative to the helicopter to which the support arm 136 is attached. During such raising and lowering, as is usual with camera booms and the like, the sphere is maintained level despite the changing angle of the support arm 136.

As will be apparent, helicopter induced vibrations and the like are isolated from the camera and gyro hemispheres 10 and 12 by the springs 132. Use of the spring arrangement, however, is not critical and other suitable arrangements can be utilized, such as hydraulic or pneumatic vibration isolating systems.

Unlike gyroscopically stabilized camera mounts of the prior art, the vibration damping assembly 108 is seen to be located completely externally of the sphere which mounts the various components of the system. Because the assembly 108 is not located within the sphere, it is possible to reduce the size of the sphere and thereby further reduce the number of obstructions to free rotation of the camera platform.

Figure 7:
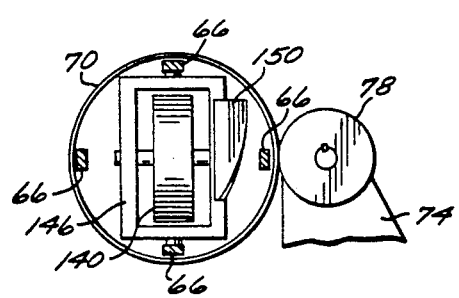
FIG. 7 is a view taken along the line 7—7 of FIG. 8.
Figure 10:
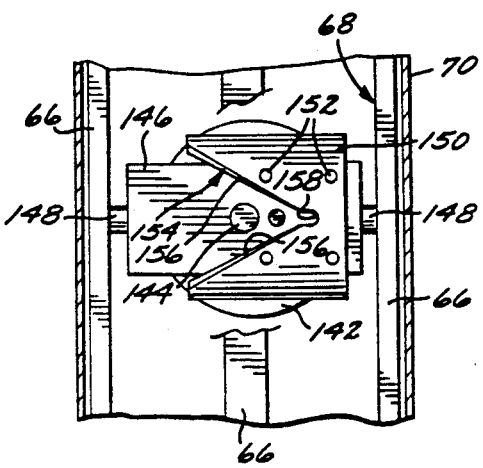
FIG. 10 is an enlarged right side elevational view of the middle gyro of the three gyros illustrated in FIG. 9, a portion of the gyro frame being cut away for clarity.

Referring now to FIGS. 7, 9 and 10, the gyro housing 70 and gyro arrangement are illustrated in detail to show the means by which the gyro platform is quickly brought back to a level position if for some reason it should drift off level.

The gyro housing 70 encloses three gyros 138, 140 and 142, which are essentially identical except for their different spin axis orientations along the roll, tilt and pan axes 20, 22 and 80 for stabilizing the gyro platform 36 in space. This being the case, only gyro 142 will be described in detail. Further, the drive means or motors for such gyros are well known and will also not be described in detail, other than to mention that the motors are energizable to rotate the gyros about their spin axes at a predetermined rate to achieve the desired inertial effect.

The gyro 142 is rotatable about a spin axis coincident in the case of gyro 142 with the gyro housing axis 72, and defined by the gyro spin shafts 144 rotatably mounted to the opposite sides of a gyro mount 146. The mount 146 in turn is rotatably mounted by mount shafts 148 to opposite posts 66 of the gyro frame 68 for rotation about a gyro precession axis defined by the shafts 148.

An arcuate erection cam 150 is fixed to the gyro mount 146 by four posts 152 for rotation with the mount 146 about the gyro precession axis. The cam 150 includes an entry throat 154 having a wide portion which narrows along converging cam surfaces 156 to a generally circular holding or locking aperture 158.

A caging or erection motor 160 having a threaded output shaft 162 is mounted adjacent the cam 150. A positioner 164 is threaded onto the shaft 162, and a projection means or pin 166 of the positioner 164 projects into the entry throat 154. In the extended position of the positioner 164, the pin 166 is located in the wide portion of the entry throat 154 and offers no resistance to rotation of the cam 150 about the precession axis within certain predetermined limits.

Assuming that the gyro platform is destabilized and rotation of the gyro mount 146 and attached cam 150 is beyond acceptable limits, energization of the erection motor 160 will cause the pin 166 to move to a releveling or retracted position. Regardless of the position of rotation of the cam 150, the retracting pin 166 will engage the cam surfaces 156 and slide into the aperture 158 to lock the gyro mount 146 in a stabilized position with the spin shafts 144 aligned with the stabilized spin axis of the gyro. Once the gyro is leveled, caged, erected or stabilized, the motor 160 is oppositely energized to move the pin 166 into the wider portion of the entry throat 154.

Similar erection cams, erection motors and positioners are arranged adjacent the other two gyros such that when the gyro platform is destabilized, all of the motors are energized simultaneously so that all gyros are caged or erected together. Once this is done, the gyro platform is relieved of the gyro leveling influence of the three gyros and the gyro platform is free to move.

Referring again to FIG. 3, the next step in releveling the gyro platform 36 is to energize the level balance motor 88 to lower the weight 92. In its raised position the weight locates the overall center of gravity such that the gyro platform is neutrally balanced about its three axes. In its lowered position the weight causes the center of gravity to be lower, which causes the platform to be bottom heavy. The gyro platform 36 thereafter levels itself under the influence of gravity.

If, during this leveling procedure, the helicopter should turn, accelerate or decelerate, a false sense of level will occur which the bottom heavy gyro platform 36 will try to follow. To prevent this from happening, an accelerometer sensor 168 mounted on the gyro platform, as seen in FIG. 8, will send a signal to the level balance motor 88 to raise the balance weight 92 to its neutral position until the disturbance is over, at which time the weight can again be lowered to continue the leveling procedure.

Once the gyro platform is leveled, the erection motors 160 are energized to retract the pins 166 so that the gyros again impose their stabilizing influence upon the gyro platform 36. The level balance motor 88 is next energized to retract the weight 92 to establish the neutral or normal position of the center of gravity.

As will be apparent, torque motors (not shown) could be located on the three gyro platform axes if it is desired to achieve faster platform leveling than is possible with the gravity leveling provided by the weight 92.

Figure 11:
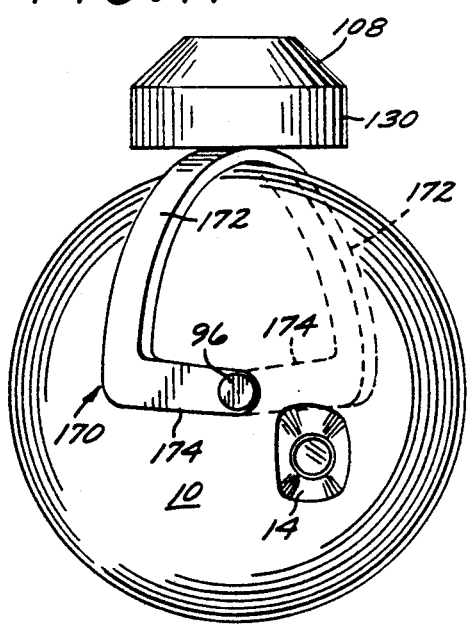
FIG. 11 is a front elevational view of a modified embodiment utilizing an offset yoke.

FIG. 11 illustrates an offset form of yoke 170 which includes a half or semicircular middle portion 172 attached at its center to the shaft 110, and having end portions 174 laterally offset from the hub shafts 96. This arrangement is advantageous in that it prevents the yoke from obscuring the camera lens during extreme rotation of the camera platform about the roll axis 20.

Figure 12:
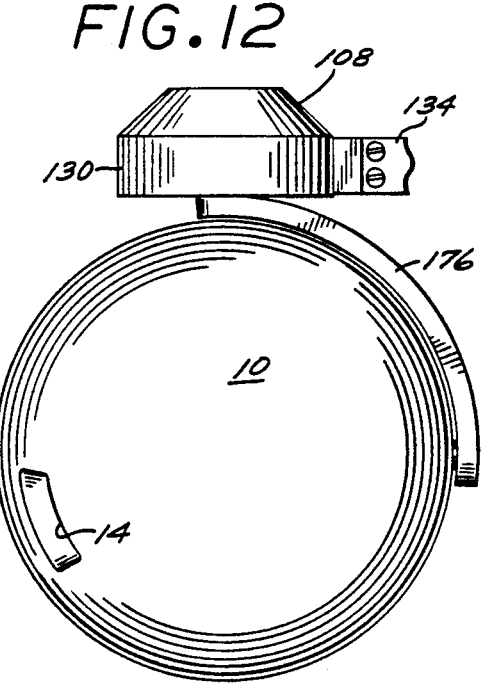
FIG. 12 is a left side elevational view of a modified embodiment utilizing a quarter circle yoke.

FIG. 12 illustrates a quarter circle configuration of yoke 176 which allows extreme travel of the camera platform 30 without the yoke obscuring the camera lens. However, since only one hub shaft and a partial yoke are employed, these components would have to be of enlarged section in order to prevent undue deflections of the structure.

Figure 13:
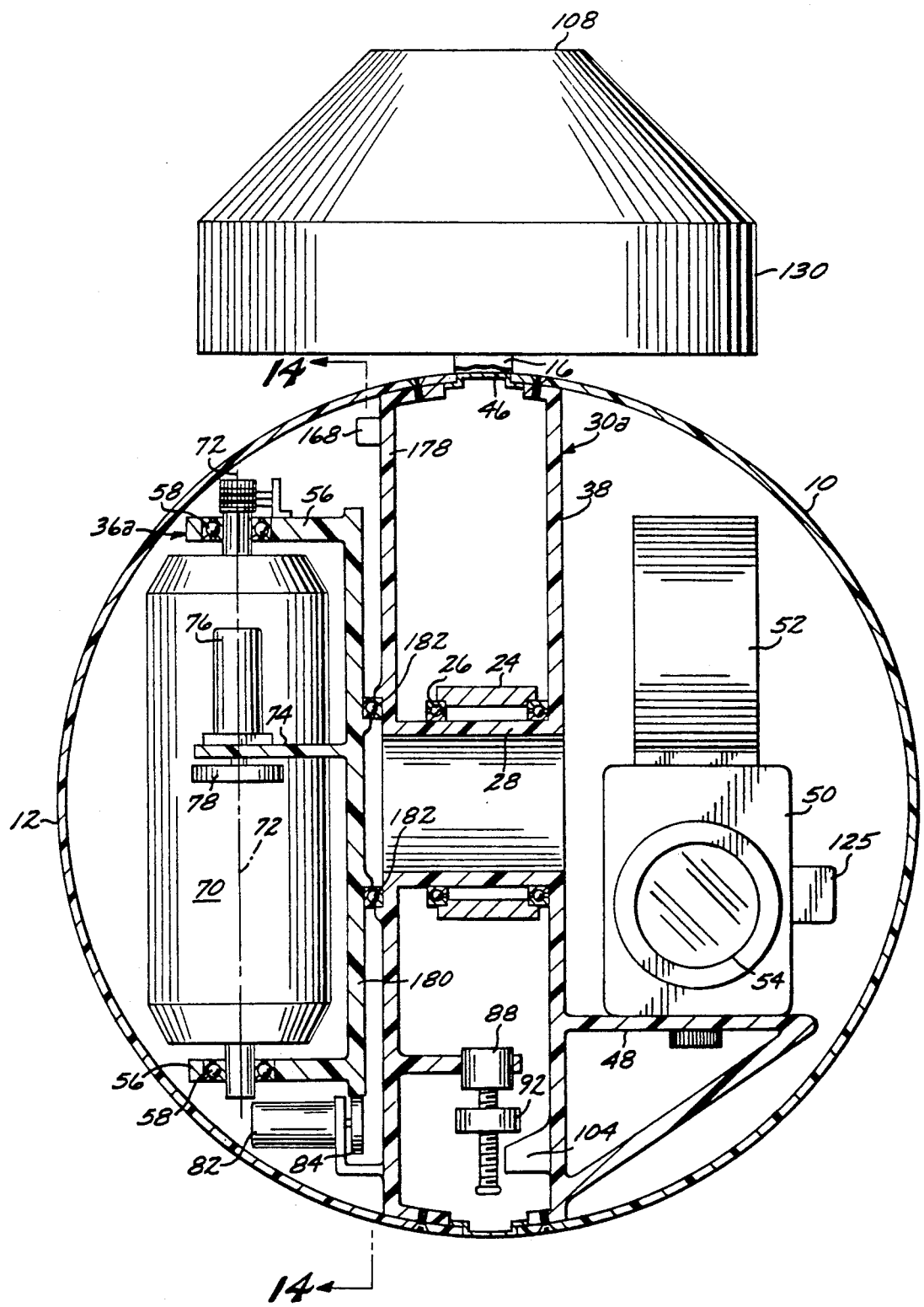
FIG. 13 is a view of like that of FIG. 3, but illustrating an embodiment in which the gyro and camera hemispheres rotate together.
Figure 14:
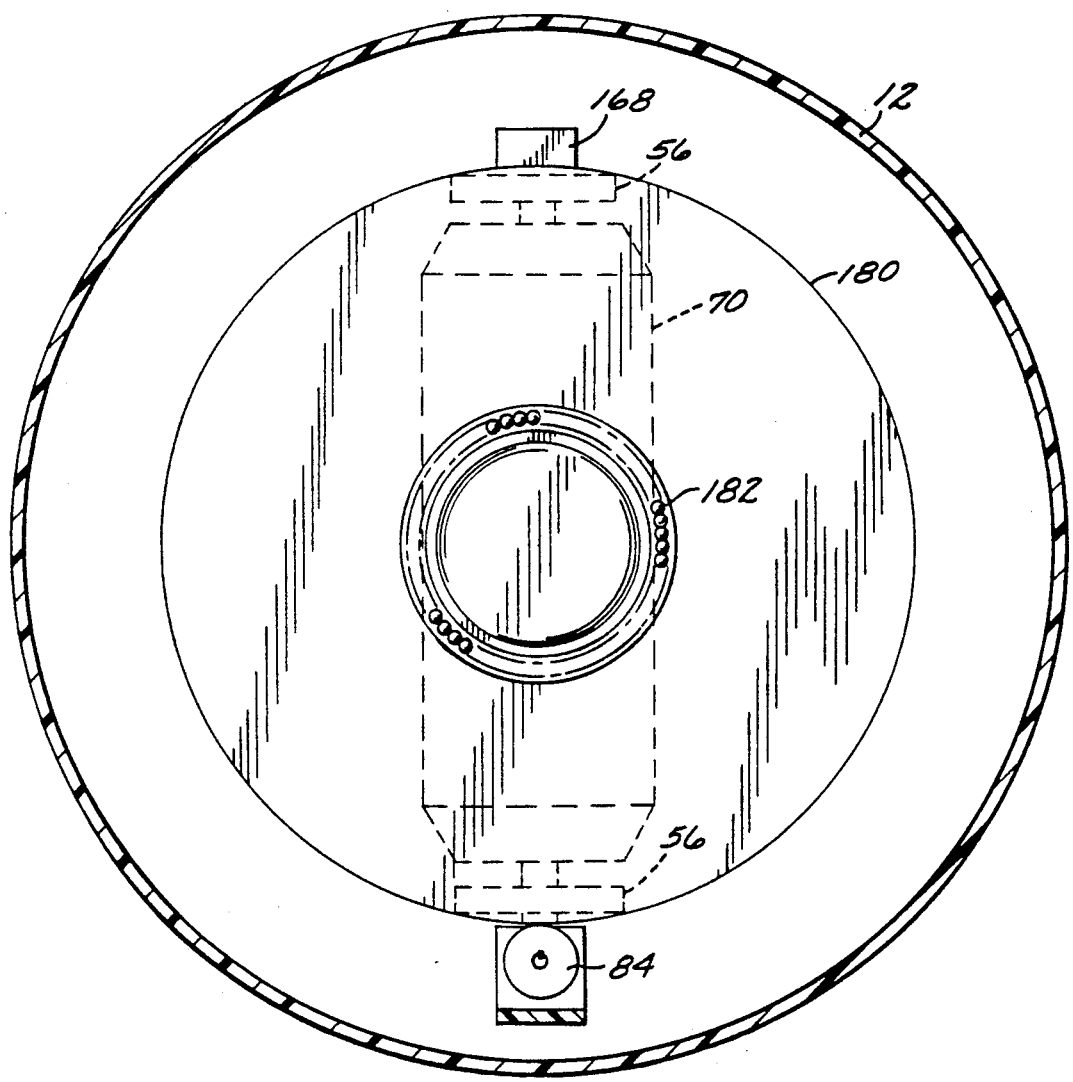
FIG. 14 is a view taken along the line 14—14 of FIG. 13.

Referring now to FIGS. 13 and 14, an embodiment of the present apparatus is illustrated in which the camera and gyro hemispheres 10 and 12 are coupled together for movement in unison about the pan and tilt axes. Where components of the embodiment are identical to those of the first embodiment, identical numerals are employed. Where the components are not identical but are similar in function, the identical numeral with the subscript "a" is employed.

The camera platform 30a is also carried by the hub block 24 for rotation about the tilt axis 22, but is now includes portions of what was before a part of the gyro platform. More particularly, the camera platform hub 28 no longer includes the driven wheel 86, but instead extends over and is attached to a vertical plate 178 which, like the gyro platform plate 42 of the first embodiment, is secured to the gyro hemisphere 12. Consequently, the camera and gyro hemispheres 10 and 12 are rotatable in unison about their tilt and pitch axes, respectively. Also, the accelerometer sensor 168 which was mounted to the gyro platform in the previous embodiment is now mounted to the camera platform, as is the level balance motor 88 and the tilt motor 82.

A circular, vertically oriented driven plate or wheel 180 now mounts the arms 56 and bearings 58 which support the gyro housing 70 for rotation about the vertical gyro housing axis 72. The output shaft of the tilt motor 82 engages the periphery of the wheel 180 to impart a rotational torque to the gyro platform 36a tending to rotate it about the tilt (pitch) axis 22. Relative rotation is possible by reason of the interposition of a suitable bearing 182 between the driven wheel 180 of the platform 36a and the added camera platform vertical plate 178. Although not illustrated in detail, the configuration of the confronting surfaces of the wheel 180 and the plate 178, and the press fit of the bearing 82 are such that the wheel 180 is supported and constrained against lateral separation from the plate 178.

The embodiment of FIGS. 13 and 14 can be advantageous if added rigidity is needed, compared to the separate rotational capability afforded by the hemispheres 10 and 12 of the first embodiment. However, during tilting the bulk of the structure sweeps around the gyro housing 70 and the electronic control unit 124 could not be mounted to the gyro platform and the control unit components would have to be broken down into smaller components and located where possible in the limited space available.

To tilt the camera 50, the tilt motor 82 is operated to impart a rotational torque upon the driven wheel 180. Since the gyro housing 70 is stabilized in space, the wheel 180 will rotate around the driven wheel 180, carrying the camera platform with it to tilt the camera platform about the tilt axis 22.

From the foregoing it will be seen that the present apparatus tends to eliminate the helicopter's unwanted movements or vibrations, but allows pitching and rolling of the helicopter to a much greater extent than previous designs during a filming procedure. The system embodies a unique leveling system and is generally smaller and more compact in overall size than prior art arrangements. In the prior art arrangement considerable extra clearance was required between the spherical fairing and the stable gyro platform since the vibration damping means was located inside the fairing.

The system also allows a far greater latitude of camera movement as well as vehicle movement compared to previous designs, and particularly those employing a universal or Cardan joint at the center of the system. The vertical support shaft associated with such a joint, which intrudes into the area occupied by the camera or gyro unit, is completely absent in the present apparatus. Thus, during helicopter banking or diving at a steep angle, there is no danger of impact of such a support shaft with the gyro platform, and consequently no possibility for such a support shaft to cause the gyros to tumble on their precession axes and cause the gyro platform to go off its usual level orientation.

Various other modifications and changes may be made with regard to the foregoing detailed description without departing from the spirit of the invention.

What is claimed is:

1. A gyroscopically stabilized apparatus for aiming an instrument at a target object, the apparatus comprising:
   hub shaft means including a pair of hub shafts disposed along a first axis and having opposite extremities, respectively;
   an instrument platform for supporting an instrument;
   a hub assembly including first bearing means defining the first axis and supporting the hub assembly upon the hub shaft means for rotation of the hub assembly about the first axis, the hub assembly including second bearing means defining a second axis perpendicular to the first axis and supporting the instrument platform upon the hub assembly for rotation of the instrument platform along a rotational path extending about the second axis;
   a gyro platform including a plurality of gyroscopes tending in operation to stabilize the gyro platform in space;
   third bearing means supporting the gyro platform upon the instrument platform for rotation of the gyro platform along a rotational path extending about the second axis;
   yoke means coupled to the hub shaft means and comprising a yoke having a half circle configuration, a midportion and opposite extremities, and coupled at its midportion to the support means, and coupled at its opposite extremities to the opposite extremities of the pair of hub shafts, and located outwardly of the rotational paths of the instrument platform and the gyro platform whereby the instrument platform and the gyro platform are rotatable about the first and second axes without engaging the yoke means; and
   support means coupled to the yoke means for supporting the hub assembly for rotation of the hub assembly about a third axis perpendicular to the first and second axes.

2. A gyroscopically stabilized apparatus for aiming an instrument at a target object, the apparatus comprising:
   hub shaft means including a pair of hub shafts disposed along a first axis and having opposite extremities, respectively;
   an instrument platform for supporting an instrument;
   a hub assembly including first bearing means defining the first axis and supporting the hub assembly upon the hub shaft means for rotation of the hub assembly about the first axis, the hub assembly including second bearing means defining a second axis perpendicular to the first axis and supporting the instrument platform upon the hub assembly for rotation of the instrument platform along a rotational path extending about the second axis;
   a gyro platform including a plurality of gyroscopes tending in operation to stabilize the gyro platform in space;
   third bearing means supporting the gyro platform upon the instrument platform for rotation of the gyro platform along a rotational path extending about the second axis;
   yoke means coupled to the hub shaft means and comprising a yoke having a central portion having a half circle configuration, and coupled at its central portion to the support means, the yoke further having opposite extremities oppositely horizontally offset, with the ends of the opposite extremities coupled to the opposite extremities of the pair of hub shaft, and located outwardly of the rotational paths of the instrument platform and the gyro platform whereby the instrument platform and the gyro platform are rotatable about the first and second axes without engaging the yoke means; and support means coupled to the yoke means for supporting the hub assembly for rotation of the hub assembly about a third axis perpendicular to the first and second axes.

3. A gyroscopically stabilized apparatus for aiming an instrument at a target object, the apparatus comprising:

hub shaft means including a hub shaft disposed along a first axis and having an outer extremity;

an instrument platform for supporting an instrument;

a hub assembly including first bearing means defining the first axis and supporting the hub assembly upon the hub shaft means for rotation of the hub assembly about the first axis, the hub assembly including second bearing means defining a second axis perpendicular to the first axis and supporting the instrument platform upon the hub assembly for rotation of the instrument platform along a rotational path extending about the second axis;

a gyro platform including a plurality of gyroscopes tending in operation to stabilize the gyro platform in space;

third bearing means supporting the gyro platform upon the instrument platform for rotation of the gyro platform along a rotational path extending about the second axis;

yoke means coupled to the hub shaft means and comprising a yoke having a quarter circle configuration and opposite extremities, and coupled at its opposite extremities to the support means and to the outer extremity of the hub shaft, respectively, and located outwardly of the rotational paths of the instrument platform and the gyro platform whereby the instrument platform and the gyro platform are rotatable about the first and second axes without engaging the yoke means; and support means coupled to the yoke means for supporting the hub assembly for rotation of the hub assembly about a third axis perpendicular to the first and second axes.

4. A gyroscopically stabilized apparatus for aiming an instrument at a target object, the apparatus comprising:

hub shaft means disposed along a first axis;

an instrument platform for supporting an instrument;

a hub assembly including first bearing means defining the first axis and supporting the hub assembly upon the hub shaft means for rotation of the hub assembly about the first axis, the hub assembly including second bearing means defining a second axis perpendicular to the first axis and supporting the instrument platform upon the hub assembly for rotation of the instrument platform along a rotational path extending about the second axis;

a gyro platform including a plurality of gyroscopes tending in operation to stabilize the gyro platform in space;

third bearing means supporting the gyro platform upon the instrument platform for rotation of the gyro platform along a rotational path extending about the second axis;

yoke means coupled to the hub shaft means and located outwardly of the rotational paths of the instrument platform and the gyro platform whereby the instrument platform and the gyro platform are rotatable about the first and second axes without engaging the yoke means;

support means coupled to the yoke means for supporting the hub assembly for rotation of the hub assembly about a third axis perpendicular to the first and second axes; and fairing means in surrounding relation to the instrument platform and the gyro platform, with the yoke means being located exteriorly of the fairing means, the fairing means comprising a first hemisphere coupled to and movable with the instrument platform, and a second hemisphere coupled to and movable with the gyro platform.

5. A gyroscopically stabilized apparatus for aiming an instrument at a target object, the apparatus comprising:

hub shaft means disposed along a first axis;

an instrument platform for supporting an instrument;

a hub assembly including first bearing means defining the first axis and supporting the hub assembly upon the hub shaft means for rotation of the hub assembly about the first axis, the hub assembly including second bearing means defining a second axis perpendicular to the first axis and supporting the instrument platform upon the hub assembly for rotation of the instrument platform along a rotational path extending about the second axis;

a gyro platform including a plurality of gyroscopes tending in operation to stabilize the gyro platform in space;

third bearing means supporting the gyro platform upon the instrument platform for rotation of the gyro platform along a rotational path extending about the second axis;

yoke means coupled to the hub shaft means and located outwardly of the rotational paths of the instrument platform and the gyro platform whereby the instrument platform and the gyro platform are rotatable about the first and second axes without engaging the yoke means;

support means coupled to the yoke means for supporting the hub assembly for rotation of the hub assembly about a third axis perpendicular to the first and second axes; and fairing means in surrounding relation to the instrument platform and the gyro platform, with the yoke means being located exteriorly of the fairing means, the fairing means comprising a first hemisphere coupled to and movable with the instrument platform, and a second hemisphere coupled to the first hemisphere for rotation therewith.

6. A gyroscopically stabilized apparatus for aiming an instrument at a target object, the apparatus comprising:

hub shaft means disposed along a first axis;

an instrument platform for supporting an instrument;

a hub assembly including first bearing means defining the first axis and supporting the hub assembly upon the hub shaft means for rotation of the hub assembly about the first axis, the hub assembly including second bearing means defining a second axis perpendicular to the first axis and supporting the instrument platform upon the hub assembly for rotation of the instrument platform along a rotational path extending about the second axis;

a gyro platform including a plurality of gyroscopes tending in operation to stabilize the gyro platform in space;

third bearing means supporting the gyro platform upon the instrument platform for rotation of the gyro platform along a rotational path extending about the second axis;

fairing means in surrounding relation to the instrument platform and the gyro platform;

yoke means coupled to the hub shaft means and located exteriorly of the fairing means and outwardly of the rotational paths of the instrument platform and the gyro platform whereby the instrument platform and the gyro platform are rotatable about the first and second axes without engaging the yoke means;

support means coupled to the yoke means for supporting the hub assembly for rotation of the hub assembly about a third axis perpendicular to the first and second axes, the support means including a support arm adapted for connection to a vehicle; and vibration isolating and damping means interposed between the yoke means and the support arm and located exteriorly of the fairing means.

7. A gyroscopically stabilized apparatus for aiming an instrument at a target object, the apparatus comprising:

hub shaft means disposed along a first axis;

an instrument platform for supporting an instrument;

a hub assembly including first bearing means defining the first axis and supporting the hub assembly upon the hub shaft means for rotation of the hub assembly about the first axis, the hub assembly including second bearing means defining a second axis perpendicular to the first axis and supporting the instrument platform upon the hub assembly for rotation of the instrument platform along a rotational path extending about the second axis;

a gyro platform including a plurality of gyroscopes tending in operation to stabilize the gyro platform in space, the gyro platform mounting a gyro housing for rotation about a fourth axis, and mounting a third axis motor having a driving element operative to develop a driving torque tending to rotate the housing about the fourth axis whereby, upon stabilization of the gyro housing, the stabilized gyro housing resists the driving torque and instead the instrument platform rotates about the third axis;

third bearing means supporting the gyro platform upon the instrument platform for rotation of the gyro platform along a rotational path extending about the second axis;

yoke means coupled to the hub shaft means and located outwardly of the rotational paths of the instrument platform and the gyro platform whereby the instrument platform and the gyro platform are rotatable about the first and second axes without engaging the yoke means; and support means coupled to the yoke means for supporting the hub assembly for rotation of the hub assembly about a third axis perpendicular to the first and second axes.

8. A gyroscopically stabilized apparatus for aiming an instrument at a target object, the apparatus comprising:

hub shaft means disposed along a first axis;

an instrument platform for supporting an instrument, and mounting a driven element for rotation about a second axis;

a hub assembly including first bearing means defining the first axis and supporting the hub assembly upon the hub shaft means for rotation of the hub assembly about the first axis, the hub assembly including second bearing means defining a second axis perpendicular to the first axis and supporting the instrument platform upon the hub assembly for rotation of the instrument platform along a rotational path extending about the second axis;

a gyro platform including a plurality of gyroscopes tending in operation to stabilize the gyro platform in space, the gyro platform mounting a second axis motor having a driving element operative to develop a driving torque tending to rotate the housing about the second axis whereby, upon stabilization of the gyro housing, the stabilized gyro housing resists the driving torque and instead the instrument platform rotates about the second axis;

third bearing means supporting the gyro platform upon the instrument platform for rotation of the gyro platform along a rotational path extending about the second axis;

yoke means coupled to the hub shaft means and located outwardly of the rotational paths of the instrument platform and the gyro platform whereby the instrument platform and the gyro platform are rotatable about the first and second axes without engaging the yoke means; and support means coupled to the yoke means for supporting the hub assembly for rotation of the hub assembly about a third axis perpendicular to the first and second axes.

9. A gyroscopically stabilized apparatus for aiming an instrument at a target object, the apparatus comprising:

hub shaft means disposed along a first axis;

an instrument platform for supporting an instrument, and mounting a second axis motor operative to develop a driving torque;

a hub assembly including first bearing means defining the first axis and supporting the hub assembly upon the hub shaft means for rotation of the hub assembly about the first axis, the hub assembly including second bearing means defining a second axis perpendicular to the first axis and supporting the instrument platform upon the hub assembly for rotation of the instrument platform along a rotational path extending about the second axis;

a gyro platform including a plurality of gyroscopes tending in operation to stabilize the gyro platform in space, the gyro platform mounting a gyro housing for rotation about a fourth axis, the gyro platform tending to be rotated about the second axis by the driving torque of the second axis motor of the instrument platform whereby, upon stabilization of the gyro housing, the stabilized gyro housing resists the driving torque and instead the instrument platform rotates about the second axis;

third bearing means supporting the gyro platform upon the instrument platform for rotation of the gyro platform along a rotational path extending about the second axis;

yoke means coupled to the hub shaft means and located outwardly of the rotational paths of the instrument platform and the gyro platform whereby the instrument platform and the gyro platform are rotatable about the first and second axes without engaging the yoke means; and support means coupled to the yoke means for supporting the hub assembly for rotation of the hub assembly about a third axis perpendicular to the first and second axes.

10. A gyroscopically stabilized apparatus for aiming an instrument at a target object, the apparatus comprising:

hub shaft means disposed along a first axis;

an instrument platform for supporting an instrument;

a hub assembly including first bearing means defining the first axis and supporting the hub assembly upon the hub shaft means for rotation of the hub assembly about the first axis, the hub assembly including bearing means defining a second axis perpendicular to the first axis and supporting the instrument platform upon the hub assembly for rotation of the instrument platform along a rotational path extending about the second axis;

a gyro platform including at least three gyroscopes tending in operation to stabilize the gyro platform in space, each gyroscope comprising a gyro frame, a gyro wheel carried by a gyro housing for rotation about a spin axis, the gyro housing being carried by the gyro frame for rotation about a precession axis; and three releveling means associated with the three gyroscopes, respectively, for immediate releveling of the gyro platform when desired, each releveling means comprising camming means carried by the gyro housing for rotation with the gyro housing about the precession axis; a projection means having a normal position out of the path of the camming means, and a relevel position in the path of rotation of the camming means, the projection means in the relevel position engaging the camming means and preventing the gyro housing from rotating, whereby simultaneous engagement of all of the camming means by the projection means prevents rotation of all of the gyro housings about their precession axes;

third bearing means supporting the gyro platform upon the instrument platform for rotation of the gyro platform along a rotational path extending about the second axis;

yoke means coupled to the hub shaft means and located outwardly of the rotational paths of the instrument platform and the gyro platform whereby the instrument platform and the gyro platform are rotatable about the first and second axes without engaging the yoke means; and support means coupled to the yoke means for supporting the hub assembly for rotation of the hub assembly about a third axis perpendicular to the first and second axes.

11. An apparatus according to claim 10 and including three erection motors for moving the three projection means into their relevel positions for engagement with the three camming means, respectively.

12. An apparatus according to claim 11 wherein each camming means includes camming surfaces for engagement by the associated projection means in any position of rotation of the camming means, whereby movement of the projection means toward its relevel position engages the projection means upon the camming surfaces and rotates the gyro housing about the precession axis until the projection means reaches its relevel position.

13. A gyroscopically stabilized apparatus for aiming a camera at a target object, the apparatus comprising:

hub shaft means disposed along a roll axis;

a camera platform for supporting a camera;

a hub assembly including first bearing means defining the roll axis and supporting the hub assembly upon the hub shaft means for rotation of the hub assembly about the roll axis, the hub assembly including second bearing means defining a tilt axis perpendicular to the roll axis and supporting the camera platform upon the hub assembly for rotation of the camera platform about the tilt axis;

a gyro platform including a plurality of gyroscopes tending in operation to stabilize the gyro platform in space;

third bearing means supporting the gyro platform upon the camera platform for rotation of the gyro platform about the tilt axis;

a pair of hemispherical fairings in adjacent relation and surrounding the camera platform and the gyro platform;

yoke means located exteriorly of the pair of fairings, and coupled to the hub shaft means; and support means coupled to the yoke means for supporting the hub assembly for rotation of the hub assembly about a pan axis perpendicular to the roll and tilt axes.

14. An apparatus according to claim 13 wherein the hub shaft means includes a pair of hub shafts having outer extremities, respectively, and the yoke means comprises a yoke having a half circle configuration, coupled at its midportion to the support means, and coupled at its opposite extremities to the opposite extremities of the pair of hub shafts.

15. An apparatus according to claim 13 wherein the hub shaft means includes a pair of hub shafts having outer extremities, respectively, and the yoke means comprises a yoke having a central portion having a half circle configuration and coupled at its midportion to the support means, the yoke further having opposite extremities oppositely horizontally offset, with the ends of the opposite extremities coupled to the opposite extremities of the pair of hub shafts.

16. An apparatus according to claim 13 wherein the hub shaft means includes a hub shaft having an outer extremity, and the yoke means comprises a yoke having a quarter circle configuration coupled at its opposite extremities to the support means and to the outer extremity of the hub shaft, respectively.

17. An apparatus according to claim 13 wherein one of the fairings is coupled to and movable with the camera platform, and the other one of the fairings is coupled to and movable with the gyro platform.

18. An apparatus according to claim 13 wherein one of the fairings is coupled to and movable with the camera platform, and the pair of fairings are coupled together for common rotation.

19. An apparatus according to claim 18 wherein the camera platform mounts a level balance motor operative to move a weight between a raised position and a lowered position for shifting downwardly the center of gravity of the fairings and the apparatus located interiorly of the fairings.

20. An apparatus according to claim 13 wherein the support means includes a support arm adapted for connection to a vehicle, and including vibration isolating and damping means interposed between the yoke means and the support arm exteriorly of the pair of fairings.

21. An apparatus according to claim 13 wherein the gyro platform mounts a gyro housing for rotation about a vertical axis, and wherein the gyro platform mounts a pan axis motor having a driving element operative to develop a driving torque tending to rotate the housing about the vertical axis whereby, upon stabilization of the gyro housing, the stabilized gyro housing resists the driving torque and instead the camera platform rotates about the pan axis.

22. An apparatus according to claim 13 wherein the camera platform mounts a driven element for rotation about the tilt axis, and wherein the gyro platform mounts a tilt axis motor having a driving element operative to develop a driving torque tending to rotate the camera platform about the tilt axis whereby, upon stabilization of the gyro housing, the stabilized gyro housing resists the driving torque and instead the camera platform rotates about the tilt axis.

23. An apparatus according to claim 13 wherein the gyro platform mounts a gyro housing for rotation about a vertical axis, and wherein the gyro platform mounts a driven element for rotation about the tilt axis, and wherein the camera platform mounts a tilt axis motor having a driving element operative to develop a driving torque tending to rotate the gyro platform about the tilt axis whereby, upon stabilization of the gyro housing, the stabilized gyro housing resists the driving torque and instead the camera platform rotates about the tilt axis.

24. An apparatus according to claim 13 and wherein each gyroscope comprises a gyro frame, a gyro wheel carried by a gyro housing for rotation about a spin axis, the gyro housing being carried by the gyro frame for rotation about a precession axis; and three releveling means associated with the three gyroscopes, respectively, for immediate releveling of the gyro platform when desired, each releveling means comprising camming means carried by the gyro housing for rotation with the gyro housing about the precession axis; a projection means having a normal position out of the path of the camming means, and a relevel position in the path of rotation of the camming means, the projection means in the relevel position engaging the camming means and preventing the gyro housing from rotating, whereby simultaneous engagement of all of the camming means by the projection means prevents rotation of all of the gyro housings about their precession axes.

25. An apparatus according to claim 24 and including three erection motors for moving the three projection means into their relevel positions for engagement with the three camming means, respectively.

26. An apparatus according to claim 25 wherein each detent means includes camming surfaces for engagement by the associated projection means in any position of rotation of the camming means, whereby movement of the projection means toward its relevel position engages the projection means upon the camming surfaces and rotates the gyro housing about the precession axis until the projection means reaches its relevel position.

27. An apparatus according to claim 13 wherein the gyro platform mounts a level balance motor operative to move a weight between a raised position and a lowered position for shifting downwardly the center of gravity of the fairings and the apparatus located interiorly of the fairings.

28. An apparatus according to claim 13 and including a camera mounted to the camera platform, and wherein one of the hemispherical fairings is a camera platform fairing which includes a camera window, the camera platform fairing being coupled to and movable with the camera platform whereby the camera and the camera window move in unison.

29. A gyroscopically stabilized apparatus for aiming an instrument at a target object, the apparatus comprising:
an instrument platform for supporting an instrument;
a gyro platform including a plurality of gyroscopes tending in operation to stabilize the gyro platform in space;
yoke means and hub means supporting the instrument platform and the gyro platform for rotation along rotational paths extending about a first axis, the hub means further supporting the instrument platform for rotation along a rotational path extending about a second axis perpendicular to the first axis, and the instrument platform further supporting the gyro platform for rotation along a rotational path extending about the second axis, the yoke means being located outwardly of all of the rotational paths of the instrument platform and the gyro platform whereby the instrument platform and gyro platform are freely rotatable about the first and second axes without striking the yoke means; and
support means coupled to the yoke means for supporting the yoke means and hub means for rotation about a third axis perpendicular to the first and second axes.

30. An apparatus according to claim 29 and including a spherical fairing means in surrounding relation to the instrument platform and the gyro platform, with the yoke means being located interiorly of the fairing means.

31. An apparatus according to claim 30 wherein the first, second and third axes intersect at a point located within the fairing.

* * * * *